(12) United States Patent
Kawada

(10) Patent No.: US 11,048,453 B2
(45) Date of Patent: Jun. 29, 2021

(54) PRINTER APPARATUS AND WIRELESS CONNECTION METHOD

(71) Applicant: SEIKO EPSON CORPORATION, Tokyo (JP)

(72) Inventor: Yuta Kawada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/831,153

(22) Filed: Mar. 26, 2020

(65) Prior Publication Data

US 2020/0310712 A1 Oct. 1, 2020

(30) Foreign Application Priority Data

Mar. 27, 2019 (JP) .............................. JP2019-060197

(51) Int. Cl.
| | | |
|---|---|---|
| *G06F 15/00* | (2006.01) | |
| *G06F 3/12* | (2006.01) | |
| *G06K 1/00* | (2006.01) | |
| *H04W 88/08* | (2009.01) | |

(52) U.S. Cl.
CPC .......... *G06F 3/1236* (2013.01); *G06F 3/1203* (2013.01); *G06F 3/1292* (2013.01); *H04W 88/08* (2013.01)

(58) Field of Classification Search
CPC .... G06F 3/1236; G06F 3/1203; G06F 3/1292; H04W 88/08
USPC ......................................... 358/1.15, 1.1, 1.14
See application file for complete search history.

(56) References Cited

U.S. PATENT DOCUMENTS

| | | | | |
|---|---|---|---|---|
| 7,979,136 B2* | 7/2011 | Young | ................... | G16H 40/67 607/60 |
| 2007/0248098 A1* | 10/2007 | Chen | ................... | H04L 63/0272 370/395.2 |
| 2009/0077187 A1* | 3/2009 | Azuma | ................. | H04W 48/18 709/206 |
| 2016/0128119 A1* | 5/2016 | Maheshwari | ........... | H04W 4/80 370/329 |
| 2017/0019413 A1* | 1/2017 | Dailly | ................ | G06Q 20/0457 |
| 2017/0364346 A1* | 12/2017 | Peng | ..................... | G06F 13/102 |

FOREIGN PATENT DOCUMENTS

JP 2007-135146 5/2007

* cited by examiner

*Primary Examiner* — Douglas Q Tran
(74) *Attorney, Agent, or Firm* — Workman Nydegger

(57) ABSTRACT

A printer apparatus includes a printing unit that performs printing; a communication unit; and a controller. The communication unit establishes a wireless connection to any one of a plurality of access points in accordance with any one of a plurality of communication schemes. The controller determines order priority for the plurality of access points to which an attempt to establish the wireless connection is to be made in accordance with a communication scheme used in a previous wireless connection to each of the plurality of access points and causes the communication unit to establish the wireless connection to an access point out of the plurality of access points in accordance with the order priority.

4 Claims, 5 Drawing Sheets

PRINTER APPARATUS AND WIRELESS CONNECTION METHOD

The present application is based on, and claims priority from JP Application Serial Number 2019-060197, filed Mar. 27, 2019, the disclosure of which is hereby incorporated by reference herein in its entirety.

BACKGROUND

1. Technical Field

The present disclosure relates to a printer apparatus that establishes a wireless connection to an access point and a wireless connection method for the printer apparatus.

2. Related Art

When a facility such as a factory, a warehouse, a shop, or the like has a fixed access point, for example, a computer can wirelessly communicate with a wirelessly connectable printer provided in the facility and perform printing, acquire printer information indicating printer settings, and set printer information. Further, a mobile terminal capable of tethering may be carried in a facility. Tethering means that a device uses, as a repeater used for connecting the device to a network, a communication function built into another device used for connecting the other device to the network. Therefore, a mobile terminal capable of tethering may function as a temporary access point.

In JP-A-2007-135146, when a plurality of access points are available, a wireless local area network (LAN) station is automatically and preferentially connected to an access point which is identified by a service set identifier (SSID) including a particular character string and from which a high-intensity radio signal is received.

A printer stores connection information about a plurality of access points, such as an SSID and a password, and wireless connections to the plurality of access points may be available. In such a case, when the printer temporarily establishes a wireless connection to a mobile terminal, disconnects the wireless connection to the mobile terminal, and then establishes a connection to a new access point, since the printer attempts to reestablish a wireless connection to a mobile terminal which is not usually used, it may take time to establish a connection to a specific fixed access point. In the wireless LAN station described above, when the intensity of a radio signal received from a mobile terminal is higher than the intensity of a radio signal received from the fixed access point, the printer attempts to establish a connection to the mobile terminal preferentially over the fixed access point. As a result, the printer is unable to establish a connection to a specific fixed access point, or it takes time to establish a connection thereto. This inconveniences a user. The same applies to mobile terminals other than printers.

SUMMARY

According to one aspect of the present disclosure, a printer apparatus includes: a printing unit that performs printing; a communication unit that establishes a wireless connection to any one of a plurality of access points in accordance with any one of a plurality of communication schemes; and a controller that determines order priority for the plurality of access points to which an attempt to establish the wireless connection is to be made in accordance with a communication scheme used in a previous wireless connection to each of the plurality of access points and causes the communication unit to establish the wireless connection to an access point out of the plurality of access points in accordance with the order priority.

Further, according to another aspect of the present disclosure, a wireless connection method for a wireless terminal that establishes a wireless connection to any one of a plurality of access points in accordance with any one of a plurality of communication schemes includes determining order priority for the plurality of access points to which an attempt to establish the wireless connection is to be made in accordance with a communication scheme used in a previous wireless connection to each of the plurality of access points, and establishing the wireless connection to an access point out of the plurality of access points in accordance with the order priority.

DESCRIPTION OF EXEMPLARY EMBODIMENTS

Figure 1:
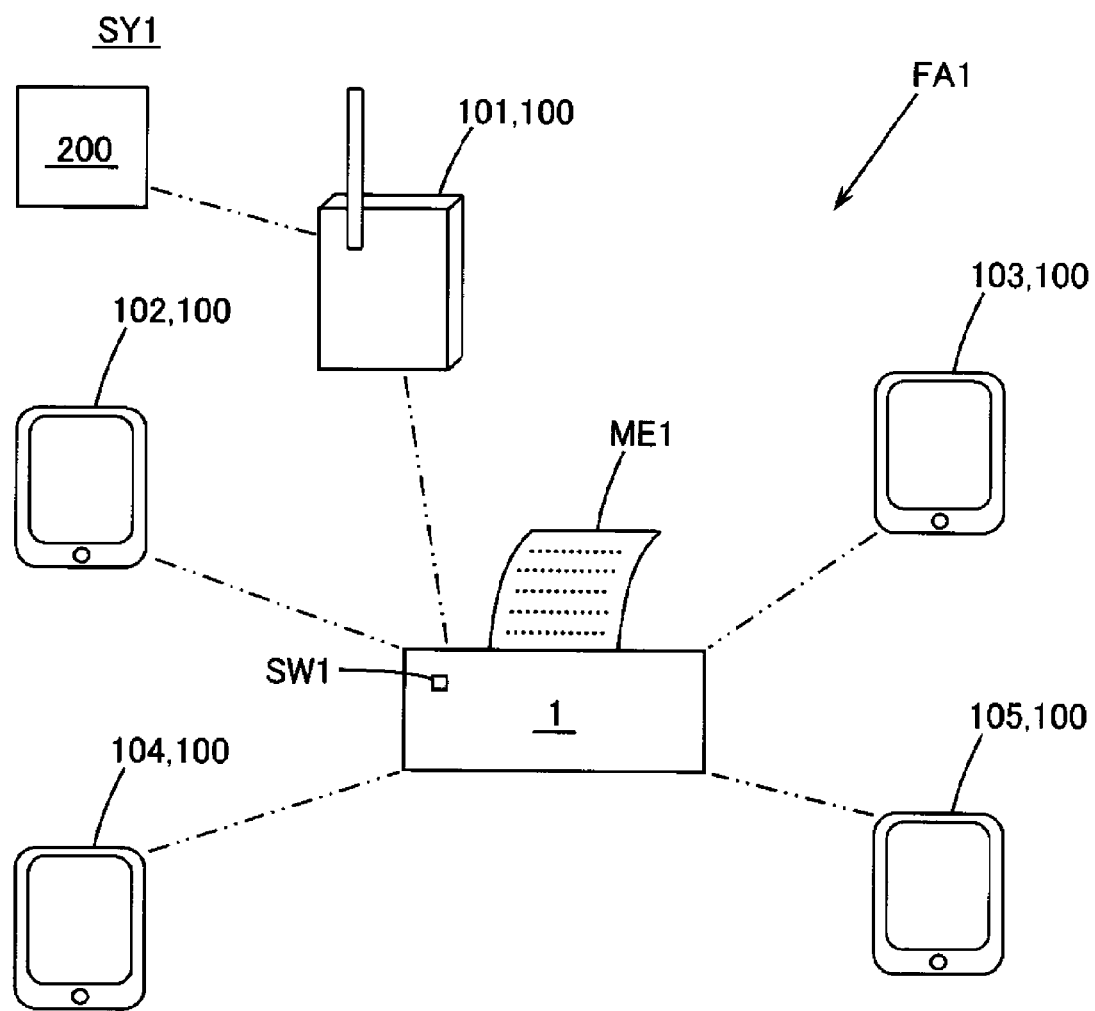
FIG. 1 is a diagram schematically illustrating an example of a network system including a printer apparatus.

Preferred embodiments of the present disclosure will be described below. The following embodiments are mere exemplary illustrations of the present disclosure, and not all of the features illustrated in the embodiments may be essential for a solution in the disclosure.

(1) OVERVIEW OF TECHNOLOGY INCLUDED IN THE PRESENT DISCLOSURE

First, an overview of technologies included in the present disclosure will be given with reference to examples illustrated in FIG. 1 to FIG. 5. Note that each of the drawings of the present application is a drawing schematically illustrating an example, the scales in respective directions illustrated in the drawings may differ from each other, and some of the drawings are not necessarily consistent with each other. The components of the present technology are not limited to the respective specific examples denoted by reference symbols. In the section "Overview of Technology Included in the Present Disclosure", text enclosed in parentheses refers to additional descriptions of the preceding term.

First Aspect

A printer apparatus in accordance with one aspect of the present technology (for example, a printer 1) has a printing unit 10 that performs printing, a communication unit 20, and a controller 40. The communication unit 20 establishes a wireless connection to any one of a plurality of access points 100 in accordance with any one of a plurality of communication schemes (for example, a method using a port number NU0). The controller 40 determines order priority for the plurality of access points 100 to which an attempt to establish a wireless connection is to be made in accordance with a communication scheme used in the wireless connection to each of the access points 100 out of the plurality of communication schemes and causes the communication unit 20 to attempt to establish a wireless connection to an access point in accordance with the order priority out of the plurality of access points 100.

To communicate with external devices, the printer apparatus makes available to the external devices a port number, which is an identification number for a network application. For example, port 515 is used for printing in accordance with a line printer daemon protocol (LPR), port 161 is used for acquisition of printer information and setting of printer information in accordance with a simple network management protocol (SNMP), and port 9100 is used for printing and for acquisition of printer information and setting of printer information. Acquisition of printer information means that an external apparatus that transmits printing data to a printer apparatus acquires printer information held in the printer apparatus. Setting of printer information means that an external apparatus that transmits printing data to a printer apparatus sets printer information held in the printer apparatus.

In such a way, once order priority of each access point 100 is determined in accordance with a communication scheme such as a method of using a port number NU0, it is possible to establish preferentially a wireless connection to an access point which is originally intended to be connected to for using the printer apparatus. Therefore, the first aspect described above may provide a printer apparatus that may reduce the time required to establish a connection to an access point which is originally intended to be connected to for using an apparatus.

The printer apparatus may be a portable compact printer apparatus or may be a large installed printer apparatus. This supplementary note is applicable to the following aspects.

Second Aspect

Figure 3:
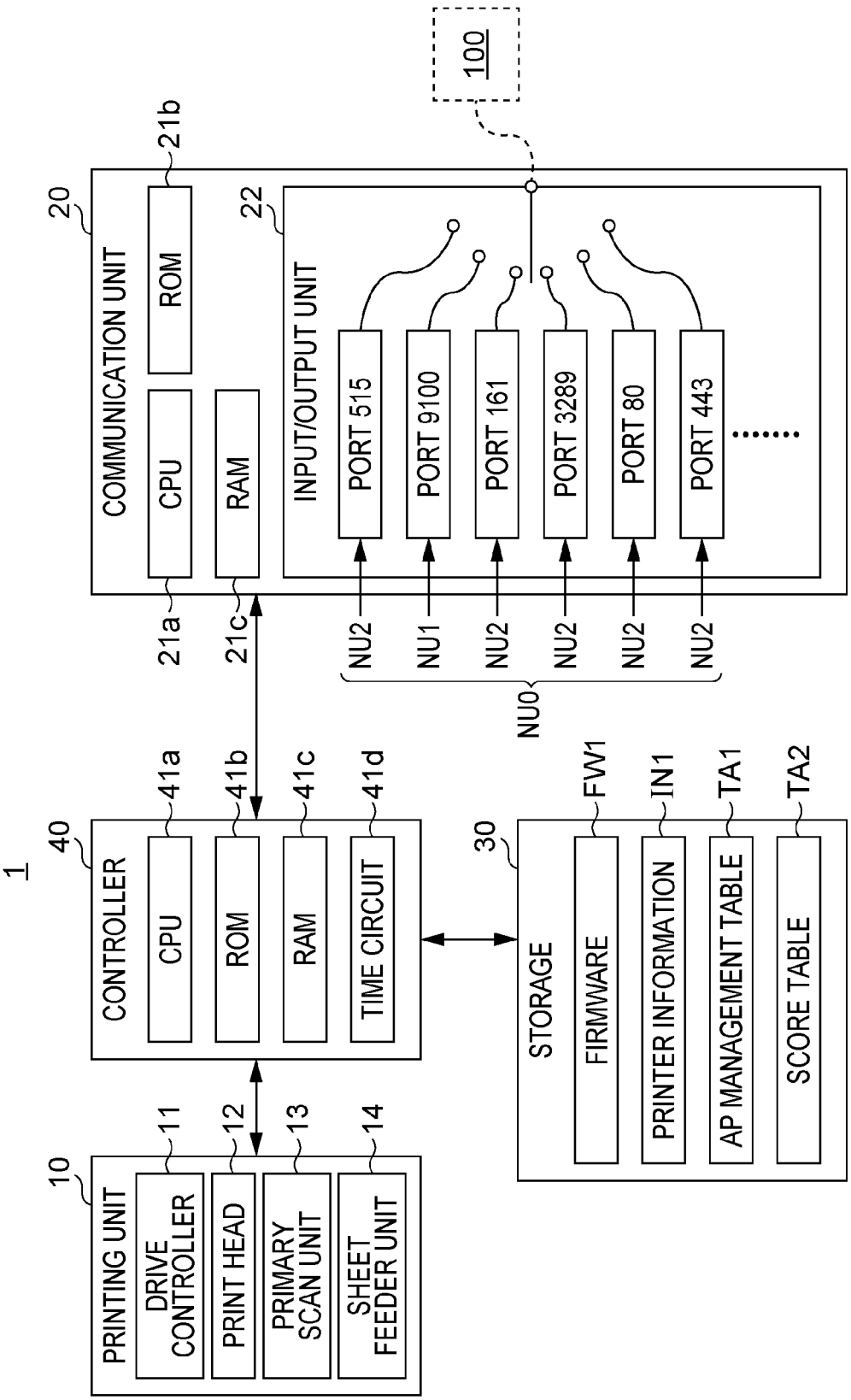
FIG. 3 is block diagram schematically illustrating a configuration example of the printer apparatus.

As illustrated in FIG. 3, for example, each of the communication schemes differ in the port number used for a wireless connection among a plurality of port numbers NU0. The controller 40 may determine order priority in accordance with a port number used for a wireless connection to each of the access points 100 out of the plurality of port numbers NU0. The present aspect may provide a preferable printer apparatus that reduces the time required to establish a connection to an access point which is originally intended to be connected to for using an apparatus.

Third Aspect

Figure 4:
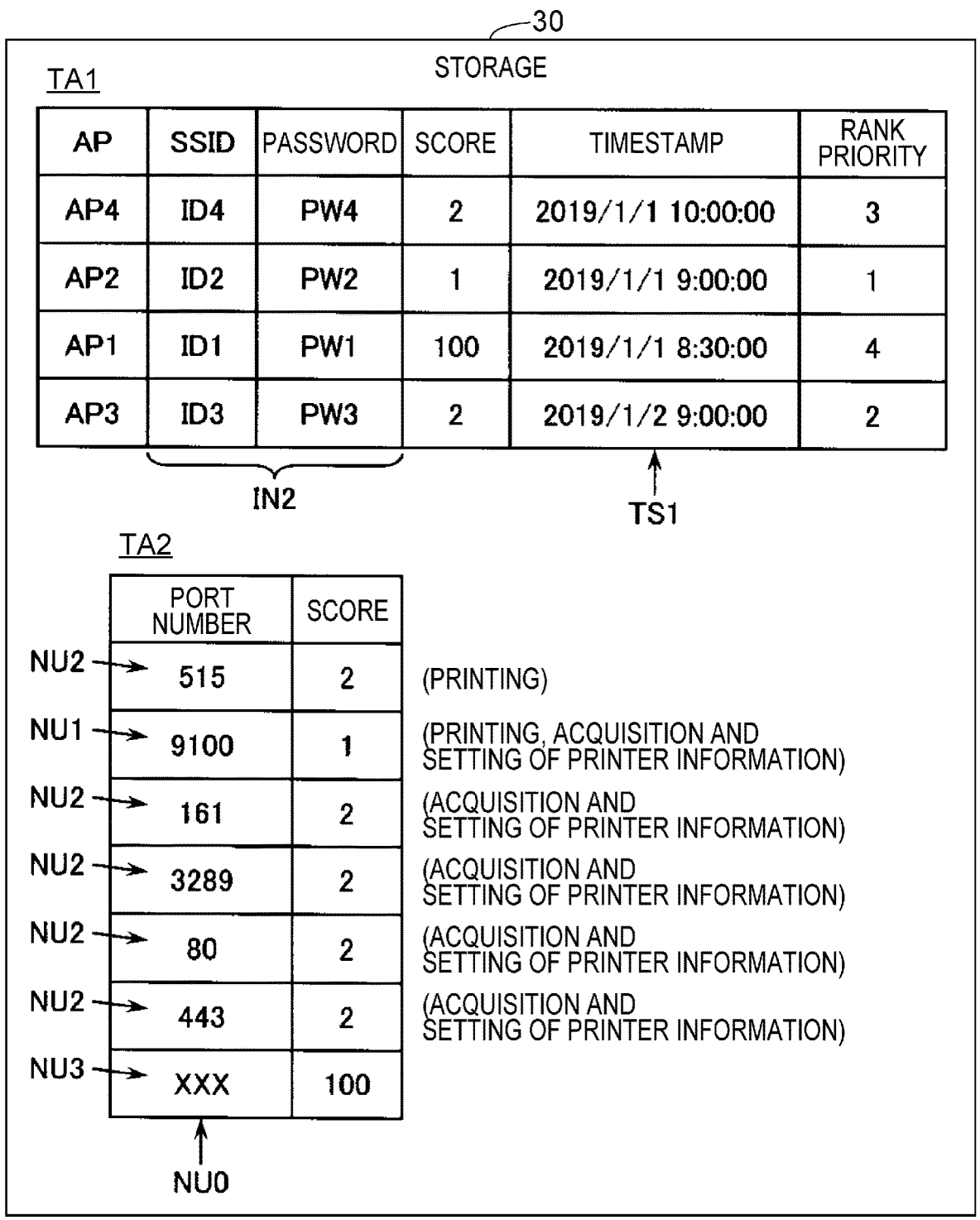
FIG. 4 is a diagram schematically illustrating a structure example of an information table stored in a storage.

As illustrated in FIG. 4, for example, the plurality of port numbers NU0 may include a first port number NU1 used for printing and at least one of acquisition of printer information IN1 indicating printing settings and setting of printer information IN1 indicating printing settings. Out of the plurality of access points 100 in the order priority, the controller 40 may give priority, over other access points, to an access point which uses the first port number NU1 for the wireless connection. An access point that attempts to establish a wireless connection using the first port number NU1 used for printing and at least one of acquisition of the printer information IN1 indicating printing settings and setting of the printer information IN1 indicating printing settings is highly likely to be an access point which is originally intended to be connected to for using the printer apparatus. Therefore, the present aspect may provide a more preferable printer apparatus that reduces the time required to establish a connection to an access point which is originally intended to be connected to for using an apparatus.

The terms "first", "second", "third", . . . , and so on as used in the present application are terms used for identifying each component included in a plurality of components that are similar to each other but do not denote order. The component of a plurality of components that corresponds to "first", "second", "third", . . . or the like is determined relatively. This supplementary note applies to the following aspects.

Fourth Aspect

As illustrated in FIG. 4, for example, the plurality of port numbers NU0 may include a second port number NU2 used for printing or at least one of acquisition of the printer information IN1 and setting of the printer information IN1. Out of the plurality of access points 100 in the order priority, the controller 40 may give the highest priority to an access point which uses the first port number NU1 for the wireless connection and give the next priority to an access point which uses the second port number NU2 for the wireless connection. An access point that attempts to establish a wireless connection using the second port number NU2 used for printing or at least one of acquisition of the printer information IN1 and setting of the printer information IN1 is highly likely to be an access point which is a printer apparatus to which the next connection is to be established. Therefore, the present aspect may provide a more preferable printer apparatus that reduces the time required to establish a connection to an access point which is originally intended to be connected to for using an apparatus.

Fifth Aspect

As illustrated in FIG. 3, for example, the present printer apparatus may further have a storage 30. The controller 40 may store a timestamp TS1 in the storage 30 in association with the access point 100 to which the wireless connection is established. When the plurality of access points 100 include a plurality of target access points having the same rank in the order priority, the controller 40 may give priority to the wireless connection to be established to a target access point associated with the latest timestamp TS1 stored in the storage 30 out of the plurality of target access points. Since a wireless connection established to a target access point associated with the latest timestamp TS1 out of the plurality of target access points having the same order priority is given the highest priority, the present aspect may provide a preferable printer apparatus that reduces the time required to establish a connection to an access point which is originally intended to be connected to for using an apparatus.

Sixth Aspect

The wireless connection method in accordance with one aspect of the present technology is a wireless connection method for a printer apparatus (for example, the printer 1) that has the printing unit 10 configured to perform printing and establishes a wireless connection to any one of the plurality of access points 100 in accordance with any one of a plurality of communication schemes. The wireless connection method includes a determination step ST1 and a connection step ST2. In the determination step ST1, order priority of the plurality of access points 100 to which an attempt to establish a wireless connection is to be made is determined in accordance with a communication scheme used for wireless communication with each of the access points 100 out of the plurality of communication schemes (for example, a method of using a port number NU0). In the connection step ST2, establishing wireless communication with an access point out of the plurality of access points 100 in accordance with the order priority is attempted.

Once the order priority of each access point 100 is determined in accordance with a communication scheme such as a method using a port number NU0, it is possible to establish preferentially a wireless connection to an access point which is originally intended to be connected to for using the printer apparatus. Therefore, the sixth aspect described above may provide a wireless connection method that may reduce the time required to establish a connection to an access point which is originally intended to be connected to for using the printer apparatus.

Furthermore, the present technology is applicable to a printer system including the printer apparatus described above, a wireless connection method for the printer system, a control program of the printer apparatus described above, a control program of the printer system described above, a computer-readable medium storing any of the control programs described above, or the like. The printer apparatus described above may be formed of a plurality of distributed components.

(2) SPECIFIC EXAMPLE OF NETWORK SYSTEM INCLUDING PRINTER APPARATUS

FIG. 1 schematically illustrates a network system SY1 including the printer 1 that is an example of the printer apparatus of the present technology. The network system SY1 illustrated in FIG. 1 is set up at a facility FA1 such as a factory, a warehouse, a shop, or the like and includes the printer 1, a fixed access point 101, and mobile terminals 102, 103, 104, and 105 capable of tethering. Each of the mobile terminals 102 to 105 is capable of tethering and thus functions as a temporary access point. For simplified illustration, the fixed access point 101 is referred to as a primary access point 101. The primary access point 101 and the mobile terminals 102 to 105 are collectively referred to as the access point 100.

For example, a wireless LAN in accordance with the standard of Institute of Electrical and Electronic Engineers (IEEE) 802.11 is used as a wireless network for wirelessly connecting the printer 1 to a host apparatus 200 via the access point 100. Each of the mobile terminals 102 to 105 may move inside a facility and, if necessary, may move outside the facility as the operator moves. When the printer 1 is a portable compact printer, the printer 1 may also move inside a facility and, if necessary, may move outside the facility as the operator moves. The printer 1 may be installed in the facility FA1 such as in the situation of a large printer. The printer 1 illustrated in FIG. 1 performs printing on a print substrate ME1 when the power switch SW1 is on. The print substrate is a material that retains a printed image. For a print substrate, a continuous sheet such as a rolled sheet, a rectangular sheet, a substantially circular medium such as an optical disc, a polygonal medium, or the like may be used. The material of a print substrate is not limited to paper such as photosensitive paper and may be a resin, a metal, or the like.

Figure 2:
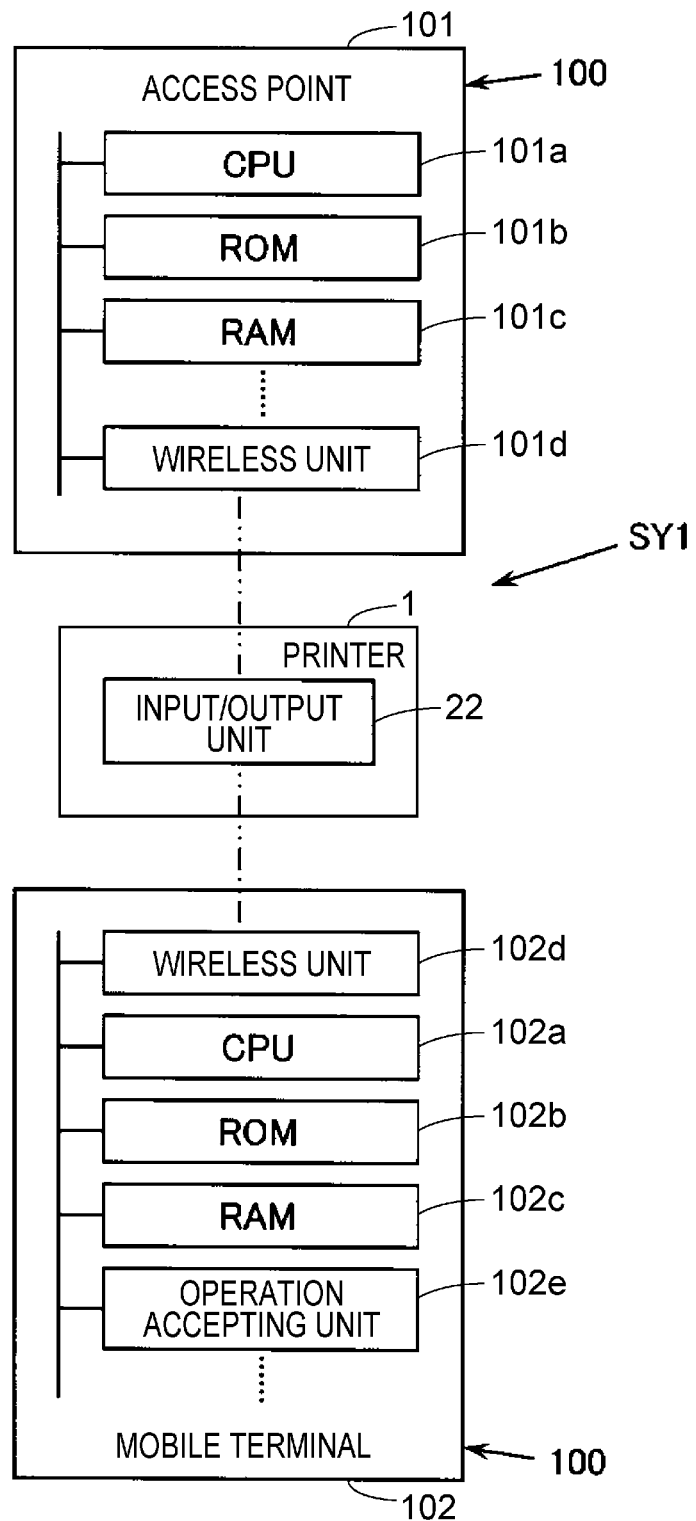
FIG. 2 is block diagram schematically illustrating a configuration example of an access point.

FIG. 2 schematically illustrates a configuration of the access point 100. Note that the configuration of the mobile terminals 103 to 105 is the same as the configuration of the mobile terminal 102 and thus is not illustrated in FIG. 2.

The primary access point 101 illustrated in FIG. 2 includes a central processing unit (CPU) 101a that is a processor, a read-only memory (ROM) 101b that is a semiconductor memory device, a random access memory (RAM) 101c that is a semiconductor memory device, a wireless unit 101d, and the like. These components 101a to 101d or the like are electrically connected to each other and can transfer information with each other. The CPU 101a runs various processes by executing a program stored in the ROM 101b while using the RAM 101c as a work area. The wireless unit 101d has a media access control address (MAC address) that is a 48-bit identification number physically allocated for uniquely identifying the wireless unit 101d, an SSID that is an identification name of an access point, a password combined with the SSID, or the like. The wireless unit 101d uses a MAC address thereof, an SSID, or a password to establish a wireless connection to a wireless device such as the printer 1, the host apparatus 200, or the like and wirelessly communicates with the wireless device in accordance with a predetermined standard. An input/output unit 22 of the printer 1 can wirelessly communicate with the wireless unit 101d.

The mobile terminal 102 illustrated in FIG. 2 has a CPU 102a, a ROM 102b, a RAM 102c, a wireless unit 102d, an operation accepting unit 102e, and the like. These components 102a to 102e or the like are electrically connected and can thereby exchange information with each other. The CPU 102a performs various processes by executing a program stored in the ROM 102b while using the RAM 102c as a work area. The wireless unit 102d has a MAC address, which is unique, for self-identification, an SSID that is an identification name of an access point, a password combined with the SSID, or the like. The wireless unit 102d uses the MAC address thereof, an SSID, or a password to establish a wireless connection to a wireless device such as the printer 1 and wirelessly communicates with the wireless device in accordance with a predetermined standard. The input/output unit 22 of the printer 1 can wirelessly communicate with the wireless unit 102d. The operation accepting unit 102e has a button or a touch panel, for example, and accepts an operation performed by the user.

FIG. 3 schematically illustrates a configuration of the printer 1. The printer information IN1 stored in the storage 30 of the printer 1 indicates settings according to which the printing unit 10 performs printing. The printer information IN1 includes information on the type of the print substrate ME1 such as whether the print substrate ME1 is a roll sheet or a cut sheet, the size of the print substrate ME1 such as whether the size of the print substrate ME1 is A4 or B5, the print mode such as whether the print mode is a color printing mode or a monochrome printing mode, or the like. FIG. 4 schematically illustrates the structure of information tables TA1 and TA2 stored in the storage 30 of the printer 1.

The printer 1 illustrated in FIG. 3 has the printing unit 10, the communication unit 20, the storage 30, and the controller 40.

The printing unit 10 illustrated in FIG. 3 has a drive controller 11, a print head 12, a primary scan unit 13, and a sheet feeder unit 14 and performs printing on the print substrate ME1 illustrated in FIG. 1. The print head 12 performs printing on the print substrate ME1. For the print head 12, an ink jet head, a thermal head, or the like may be used. The primary scan unit 13 has a motor used for a primary scan and causes the print head 12 to move in a forward direction and a reverse direction that are orthogonal to a feed direction of the print substrate ME1. The sheet feeder unit 14 has a motor used for operating a sheet feeder and causes the print substrate ME1 to move in the feed direction. The drive controller 11 controls a printing operation performed by the print head 12, an operation of the primary scan unit 13, and an operation of the sheet feeder unit 14 in accordance with an instruction from the controller 40.

The communication unit 20 illustrated in FIG. 3 has a CPU 21a that is a processor, a ROM 21b that is a semiconductor memory device, a RAM 21c that is a semiconductor memory device, an input/output unit 22, and the like. The communication unit 20 uses any one of the plurality of port numbers NU0 to establish a wireless connection to any one of the plurality of access points 100. The CPU 21a performs various processes by executing a program stored in the ROM 21b while using the RAM 21c as a work area. The input/output unit 22 has the plurality of port numbers NU0, determines a port number to be used out of the plurality of port numbers NU0 when a wireless connection is requested by the access point 100, and notifies the controller 40 of the determined port number. The port number NU0 is a number used for specifying a process performed by the controller 40.

FIG. 3 and FIG. 4 illustrate the port numbers NU0 below.

The port 515 is a port used for printing in accordance with LPR.

The port 9100 is a port number used for printing and for acquisition of the printer information IN1 and setting of the printer information IN1.

The port 161 is a port number used for acquisition of the printer information IN1 and setting of the printer information IN1 in accordance with SNMP.

The port 3289 is a port number used for acquisition of the printer information IN1 and setting of the printer information IN1 in accordance with command transmission.

The port 80 is a port number used for acquisition of the printer information IN1 and setting of the printer information IN1 in accordance with HyperText Transfer Protocol (HTTP). It can be said that the port 80 is used for acquisition of the printer information IN1 and setting of the printer information IN1 by using a web browser.

The port 443 is a port number used for acquisition of the printer information IN1 and setting of the printer information IN1 in accordance with Hypertext Transfer Protocol over Transport Layer Security (HTTPS). It can be said that the port 443 is used for acquisition of the printer information IN1 and setting of the printer information IN1 by using a web browser.

Further, as illustrated as No. XXX in FIG. 4, there is a port number used for neither printing nor acquisition of the printer information IN1 and setting of the printer information IN1.

Note that acquisition of the printer information IN1 means that an external apparatus that transmits print data to the printer 1 acquires the printer information IN1 held in the printer. Setting of the printer information IN1 means that an external apparatus that transmits print data to the printer 1 sets printer information IN1 held in the printer. For example, settings of the printer information IN1 may be the following:
(Example 1) a setting of a user of a printer as a setting in accordance with SNMP,
(Example 2) a setting of an SSID, a password, and an encryption scheme of a wireless LAN to be used as a setting in accordance with HTTP or HTTPS, and
(Example 3) a setting of a service to be used, for example, time synchronization as a setting in accordance with HTTP or HTTPS.

The storage 30 stores firmware FW1, printer information IN1, an access point management table TA1, and a score table TA2. In FIG. 3 and FIG. 4, the access point management table is denoted as AP management table. The firmware FW1 includes a program used for controlling the operation of the printing unit 10, a program used for inputting and outputting data to and from the communication unit 20, a program used for performing a wireless connection process illustrated in FIG. 5, or the like.

In the access point management table TA1 illustrated in FIG. 4, an SSID, a password, a score, the timestamp TS1, and rank priority are stored in association with each access point 100. In FIG. 4, the access point is denoted as AP. A combination of an SSID and a password corresponds to the connection information IN2 used for connection to the access point 100. The score indicates order priority of each access point 100 and is provided in accordance with a score table TA2 described later. The timestamp TS1 represents time information associated with the access point 100 and, in this specific example, the timestamp TS1 represents a date and time when a connection of the printer 1 and the access point 100 is disconnected. The rank priority is order of the plurality of access points 100 to be attempted for a wireless connection. For the rank priority in this specific example, both the score and the timestamp TS1 are taken into consideration. Herein, in the plurality of access points 100, order defined by a score is referred to as "order priority", and order defined by the timestamp TS1 in addition to the score is referred to as "rank priority". For example, in the access point management table TA1 illustrated in FIG. 4, since both the access point AP4 and the access point AP3 have a score of 2 and have different timestamps TS1 from each other, the access point AP4 and the access point AP3 have the same order priority and different rank priority from each other.

In the score table TA2 illustrated in FIG. 4, scores are stored in association with respective port numbers NU0 in which a score of a smaller value is prioritized. In this specific example, scores are set in accordance with the following rules:
(Rule 1) the score is 1 when the first port number NU1 used for printing and for acquisition of the printer information IN1 and setting of the printer information IN1 is used,
(Rule 2) the score is 2 when the second port number NU2 used for either one of printing or acquisition of the printer information IN1 and setting of the printer information IN1 is used, and
(Rule 3) the score is 100 when the third port number NU3 used for neither printing nor acquisition of the printer information IN1 and setting of the printer information IN1 is used.

Herein, the port number NU0 collectively refers to the first port number NU1, the second port number NU2, and the third port number NU3. A method of using the port number NU0 is an example of a communication scheme.

Out of the plurality of access points 100, an access point to be connected with the highest priority is the first port number NU1, specifically, an access point using the port 9100. This is because the port 9100 can be used both for printing and for acquisition of the printer information IN1 and setting of the printer information IN1 in contrast to the port 515 that can be used only for printing and the port 161, the port 3289, the port 80, and the port 443 that can be used only for acquisition of the printer information IN1 and setting of the printer information IN1. In other words, this is because the access points 100 using the first port number NU1 is versatile. On the other hand, there is no difference in the order priority among a plurality of second numbers NU2, specifically, the port 515, the port 161, the port 3289, the port 80, and the port 443. The order priority of an access point which has never used the first port number NU1 or the second port number NU2 is the lowest.

The controller 40 illustrated in FIG. 3 has a CPU 41a that is a processor, a ROM 41b that is a semiconductor memory device, a RAM 41c that is a semiconductor memory device, a time circuit 41d, and the like. The controller 40 performs a control process of printing performed by the printing unit 10, a response process in accordance with a request for acquisition and a request for setting of the printer information IN1, a wireless connection process illustrated in FIG. 5, or the like. The CPU 41a performs various processes by executing a program stored in the ROM 41b and the firmware FW1 while using the RAM 41c as a work area. The time circuit 41d measures the current time and can output the current time.

For example, once the host apparatus 200 wirelessly transmits a print instruction to the printer 1 via the access point 100, the communication unit 20 selects the port 515 or the port 9100 for wireless communication and notifies the controller 40 of the selected port number NU0. The controller 40 receives a notification of the selected port number NU0 from the communication unit 20 and causes the printing unit 10 to perform printing in accordance with print data included in the print instruction. Note that each of the mobile terminals 102 to 105 can wirelessly transmit a print instruction to the printer 1.

Further, once the host apparatus 200 wirelessly transmits a request for acquisition of the printer information IN1 to the printer 1 via the access point 100, the communication unit 20 selects the port 9100, the port 161, the port 3289, the port 80, or the port 443 for wireless communication and notifies the controller 40 of the selected port number NU0. The controller 40 receives the notification of the selected port number NU0 from the communication unit 20, reads at least a part of the printer information IN1 from the storage 30 in accordance with the request for acquisition of the printer information IN1, and controls the communication unit 20 to wirelessly transmit the read information to the host apparatus 200. Note that each of the mobile terminals 102 to 105 can wirelessly transmit a request for acquisition of the printer information IN1 to the printer 1.

Furthermore, once the host apparatus 200 wirelessly transmits a request for setting of the printer information IN1 to the printer 1 via the access point 100, the communication unit 20 selects the port 9100, the port 161, the port 3289, the port 80, or the port 443 for wireless communication and notifies the controller 40 of the selected port number NU0. The controller 40 receives the notification of the selected port number NU0 from the communication unit 20 and updates the printer information IN1 in the storage 30 in accordance with setting information included in the request for setting of the printer information IN1. Note that each of the mobile terminals 102 to 105 can wirelessly transmit a request for setting of the printer information IN1 to the printer 1.

(3) SPECIFIC EXAMPLE OF WIRELESS CONNECTION PROCESS

Figure 5:
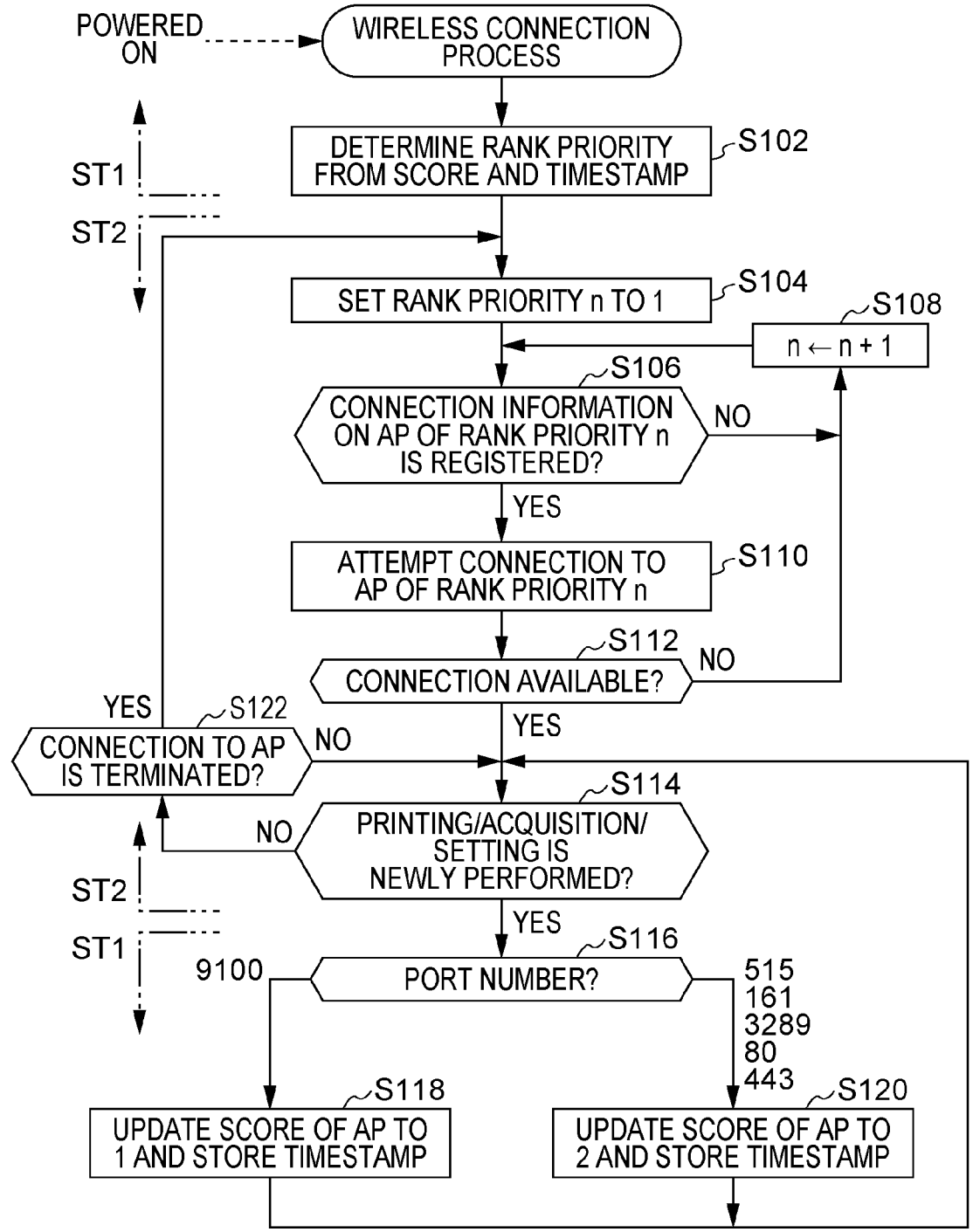
FIG. 5 is a flowchart schematically illustrating an example of a wireless connection process.

FIG. 5 schematically illustrates a wireless connection process performed in the controller 40 of the printer 1. Herein, steps S102 and S116 to S120 correspond to the determination step ST1, and steps S104 to S114 and S122 correspond to the connection step ST2. The term "step" will be omitted below. A score 100 is temporarily registered in an access point newly registered in the access point management table TA1 illustrated in FIG. 4.

Once the printer 1 is powered on in response to an operation on a power switch SW1 illustrated in FIG. 1, the controller 40 starts a wireless connection process. First, in S102, the controller 40 determines rank priority of each access point 100 in accordance with scores and timestamps TS1 stored in the access point management table TA1 illustrated in FIG. 4. In the example illustrated in FIG. 4, since the access point having score 1 is the access point AP2 only, the access point AP2 is set to rank priority 1. Since AP4 and AP3 are the access points having score 2, the order priority in accordance with the score is the same between AP4 and AP3. Herein, AP4 and AP3 will be each referred to as a target access point. The controller 40 sets the target access point AP3 to rank priority 2 whose timestamp TS1 associated with the access point management table TA1 is the latest out of the target access points AP4 and AP3. The remaining target access point AP4 is set to rank priority 3. Finally, since the access point having score 100 is the AP1 only, the access point AP1 is set to rank priority 4.

Note that the rank priority is associated with each access point 100 and thus is not required to be stored in the access point management table TA1.

After determination of rank priority, in S104, the controller 40 sets a variable n denoting rank priority to be 1. Next, in S106, the controller 40 branches the process in accordance with whether or not the connection information IN2 on the access point 100 having rank priority n is registered in the access point management table TA1. As described above, the connection information IN2 is a combination of an SSID and a password, for example. If the connection information IN2 is not registered, in S108, the controller 40 increments by one the variable n representing the rank priority. The controller 40 then performs the determination process of S106 again.

If the connection information IN2 is registered, in S110, the controller 40 causes the communication unit 20 to attempt a wireless connection to the access point 100 of rank priority n. For example, when the access point of rank priority n=1 is AP2, a wireless connection to the access point AP2 is attempted.

After attempting the wireless connection, in S112, the controller 40 branches the process in accordance with whether or not a wireless connection to the access point 100 of rank priority n is established. If the wireless connection is not established, the controller 40 transfers the process to S108. Therefore, if no wireless connection is established, a wireless connection to the access point 100 of rank priority n will be attempted while the rank priority n is incremented one by one. For example, when the access point having the incremented rank priority n=2 is AP3, a wireless connection to the access point AP3 will be attempted.

If the wireless connection is established, in S114, the controller 40 branches the process in accordance with whether or not printing performed by the printing unit 10, acquisition of the printer information IN1, or setting of the printer information IN1 is newly performed. If the printing, the acquisition, or the setting described above is newly performed, in S116, the controller 40 branches the process in accordance with the used port number NU0.

When the used port number NU0 is the first port number NU1, for example, No. 9100, the controller 40 transfers the process to S118. In S118, the controller 40 updates, to 1, the score of the access point 100 having rank priority n in accordance with the score table TA2 illustrated in FIG. 4. Further, the controller 40 acquires the current date and time from the time circuit 41d and stores the current date and time in the access point management table TA1 as the timestamp TS1 in association with the access point 100 of rank priority n. For example, when the access point of rank priority n=1 is AP2, a new timestamp TS1 will be associated with the access point AP2 and stored in the access point management table TA1. The controller 40 then returns the process to S114. Therefore, the process of S114, S116, and S118 is repeated while a wireless connection to the access point 100 of rank priority n is being held.

When the used port number NU0 is the second port number NU2, for example, No. 515, No. 161, No. 3289, No. 80, or No. 443, the controller 40 transfers the process to S120. In S120, the controller 40 updates, to 2, the score of the access point 100 having rank priority n in accordance with the score table TA2 illustrated in FIG. 4. Further, the controller 40 acquires the current date and time from the time circuit 41d and stores the current date and time in the access point management table TA1 as the timestamp TS1 in association with the access point 100 of rank priority n. For example, when the access point of rank priority n=2 is AP3, a new timestamp TS1 will be associated with the access point AP3 and stored in the access point management table TA1. The controller 40 then returns the process to S114. Therefore, the process of S114, S116, and S120 is repeated while a wireless connection to the access point 100 of rank priority n is being held.

If the printing, the acquisition, or the setting described above is not performed in S114, in S122, the controller 40 branches the process in accordance with whether or not the wireless connection to the access point 100 of rank priority n is disconnected. If the wireless connection is not disconnected, the controller 40 returns the process to S114. For example, when the access point of rank priority n=4 is AP1 and the access point AP1 is not used for the printing, the acquisition, or the setting described above, the process of S114 and S122 is repeated until the wireless connection to the access point AP1 is disconnected. If the wireless connection is disconnected, the controller 40 returns the process to S104. Accordingly, rank priority n returns to 1, a wireless connection to an access point in accordance with the rank priority out of the plurality of access points 100 is attempted again.

In response to the process of S116 to S120 described above, order priority of the plurality of access points 100 to be attempted for a wireless communication is determined in accordance with a port number used for a wireless communication to each access point 100 out of the plurality of port numbers NU0. Herein, out of the plurality of access points 100, an access point used for the printing, the acquisition, and the setting described above is given the highest priority for a wireless connection, and an access point used for either one of the printing or the acquisition and setting is the next priority for a wireless connection. Further, when a plurality of access points 100 include a plurality of the target access points having the same rank in the order priority as a result of the process of S102 and S116 to S120 described above, the timestamp TS1 associated in the access point management table TA1 is reflected to rank priority. Accordingly, out of a plurality of target access points, a wireless connection to a target access point having the latest timestamp TS1 associated in the access point management table TA1 is given the highest priority.

Then, as a result of the process of S104 to S114 and S122 described above, a wireless connection to an access point out of a plurality of access points 100 is performed by the communication unit 20 in accordance with order priority, in particular, rank priority.

As described above, since a wireless connection to an access point which uses the versatile first port number NU1 is given the highest priority, the present specific example enables a preferential wireless connection to an access point which is originally intended to be connected to for using the printer. Further, even when a wireless connection to an access point which uses the first port number NU1 is unavailable, a wireless connection to an access point which uses the second port number NU2 used for a use specific to a printer is given the next priority. This suppresses a wireless connection to an access point which is not intended by the user of the printer 1 and enables a preferential wireless connection to an access point which is originally intended to be connected to for using the printer apparatus. Therefore, the present specific example enables a reduction of time required for establishing a connection to an access point which is originally intended to be connected to for using the printer apparatus.

(4) MODIFIED EXAMPLES

Various modified examples are conceivable for the present disclosure.

For example, the wireless connection process described above is not limited to the example processed by a CPU but may be performed by another electronic component such as an application specific integrated circuit (ASIC). The wireless connection process may be performed in cooperation with a plurality of CPUs or may be performed in cooperation with one or more CPUs and one or more electronic components such as an ASIC.

Further, the wireless connection process described above may be changed as appropriate, for example, the order of operations may be changed.

Further, the present disclosure is applicable to other mobile terminals such as a scanner, a projector, a mobile phone, or the like other than a printer.

The first port number NU1 used by an access point of the highest priority for a wireless connection is not limited to the port number used for printing and for acquisition of printer information and setting of printer information. For example, the first port number NU1 may be a port number used for printing and acquisition of printer information without being used for setting of printer information or may be a port number used for printing and setting of printer information without being used for acquisition of printer information.

The second port number NU2 used by an access point of the next priority for a wireless connection is not limited to the port number used for either printing or acquisition of printer information and setting of printer information. For example, the second port number NU2 may be a port number used for acquisition of printer information without being used for setting of printer information or may be a port number used for setting of printer information without being used for acquisition of printer information.

The order priority of a plurality of access points to be attempted for a wireless connection is not limited to three levels such as the scores described above. For example, the order priority may include two levels, which means that an access point which uses the first port number NU1 described above is prioritized and an access point which does not use the first port number NU1 is not prioritized. Alternatively, the order priority may include two levels, which means that an access point which uses the first port number NU1 and the second port number NU2 described above is prioritized and an access point which uses neither the first port number NU1 nor the second port NU2 is not prioritized. In such a case, the order priority of an access point which uses the second port number NU2 is the same as the order priority of an access point which uses the first port number NU1. The order priority may include four or more levels.

Furthermore, although the timestamp TS1 is taken into consideration to determine rank priority of an access points in the embodiment described above, the present technology includes a case where the timestamp TS1 is not taken into consideration.

(5) CONCLUSION

As described above, according to the present disclosure, in various forms, it is possible to provide a technology such as a printer apparatus that may reduce time required for establishing a connection to an access point which is originally intended to be connected to for using an apparatus. The basic effects and advantages described above may be obtained with a technology made of only the requirement recited in an independent claim.

Further, a configuration in which respective features disclosed in the above example are replaced with each other or the combination thereof is changed, a configuration in which respective features disclosed in a known art and the above example are replaced with each other or the combination thereof is changed, or the like may be implemented. The present disclosure includes these configurations or the like.

What is claimed is:

1. A printer apparatus comprising:
a printing unit that performs printing;
a communication unit that establishes a wireless connection to any one of a plurality of access points in accordance with any one of a plurality of communication schemes; and
a controller that determines order priority for the plurality of access points to which an attempt to establish the wireless connection is to be made in accordance with a communication scheme used in a previous wireless connection to each of the plurality of access points and causes the communication unit to establish the wireless connection to an access point out of the plurality of access points in accordance with the order priority,
wherein
the communication schemes differ in a port number used for the wireless connection out of a plurality of port numbers,
the controller determines the order priority in accordance with a port number used for the wireless connection to each of the access points out of the plurality of port numbers,
the plurality of port numbers include a first port number used for the printing and at least one of acquisition of printer information representing a printing setting and setting of printer information representing a printing setting, and
out of the plurality of access points in the order priority, the controller gives a highest priority, over other access points, to an access point which uses the first port number for the wireless connection.

2. The printer apparatus according to claim 1, wherein
the plurality of port numbers include a second port number used for any one of the printing and at least one of the acquisition and the setting of the printer information, and
out of the plurality of access points in the order priority, the controller gives a highest priority to the access point which uses the first port number for the wireless connection and gives a next priority to an access point which uses the second port number for the wireless connection.

3. An apparatus comprising:
a communication unit that establishes a wireless connection to any one of a plurality of access points in accordance with any one of a plurality of communication schemes;
a controller that determines order priority for the plurality of access points to which an attempt to establish the wireless connection is to be made in accordance with a communication scheme used in a previous wireless connection to each of the plurality of access points and causes the communication unit to establish the wireless connection to an access point out of the plurality of access points in accordance with the order priority; and
a storage,
wherein the controller is configured to:
cause the storage to store a timestamp in association with the access point to which the wireless connection was established, and
give a highest priority to the wireless connection to a target access point that is associated with a latest timestamp in the storage out of a plurality of target access points when the plurality of access points include the plurality of target access points having a same rank.

4. A wireless connection method for a wireless terminal that establishes a wireless connection to any one of a plurality of access points in accordance with any one of a plurality of communication schemes, the wireless connection method comprising:
determining order priority for the plurality of access points to which an attempt to establish the wireless connection is to be made in accordance with a communication scheme used in a previous wireless connection to each of the plurality of access points;
establishing the wireless connection to an access point out of the plurality of access points in accordance with the order priority;
cause a storage to store a timestamp in association with the access point to which the wireless connection was established; and
give a highest priority to the wireless connection to a target access point that is associated with a latest timestamp in the storage out of a plurality of target access points when the plurality of access points include the plurality of target access points having a same rank.

* * * * *